United States Patent
Iwashita (10) Patent No.: US 11,029,498 B2
(45) Date of Patent: Jun. 8, 2021

(54) SINGLE-FOCAL LENS SYSTEM, IMAGING DEVICE HAVING SINGLE-FOCAL LENS SYSTEM, AND MOVING BODY HAVING IMAGING DEVICE

(71) Applicant: Panasonic Intellectual Property Management Co., Ltd., Osaka (JP)

(72) Inventor: Tsutomu Iwashita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 150 days.

(21) Appl. No.: 16/483,187

(22) PCT Filed: Feb. 27, 2018

(86) PCT No.: PCT/JP2018/007353
§ 371 (c)(1),
(2) Date: Aug. 2, 2019

(87) PCT Pub. No.: WO2018/190014
PCT Pub. Date: Oct. 18, 2018

(65) Prior Publication Data
US 2019/0361207 A1    Nov. 28, 2019

(30) Foreign Application Priority Data

Apr. 14, 2017    (JP) .............................. JP2017-080186

(51) Int. Cl.
*G02B 13/04*    (2006.01)
*G02B 9/60*    (2006.01)
*G02B 13/18*    (2006.01)

(52) U.S. Cl.
CPC ............... *G02B 13/04* (2013.01); *G02B 9/60* (2013.01); *G02B 13/18* (2013.01)

(58) Field of Classification Search
CPC .......... G02B 13/04; G02B 9/60; G02B 13/18; G02B 13/06; G02B 13/0045; G02B 13/16
See application file for complete search history.

(56) References Cited

U.S. PATENT DOCUMENTS

2010/0188757 A1    7/2010    Saitoh
2010/0254025 A1    10/2010    Yoshida et al.
(Continued)

FOREIGN PATENT DOCUMENTS

CN    101261354    9/2008
JP    2003-307674    10/2003
(Continued)

OTHER PUBLICATIONS

International Search Report dated May 22, 2018 in corresponding International Application No. PCT/JP2018/007353.

*Primary Examiner* — Wen Huang
(74) *Attorney, Agent, or Firm* — Wenderoth, Lind & Ponack, L.L.P.

(57) ABSTRACT

A single-focal lens system includes a first lens group having positive power, an aperture diaphragm, and a second lens group having positive power, in this order from an object side to an image side. The first lens group includes a first lens element having negative power, a second lens element having negative power, and a third lens element having positive power in this order from the object side to the image side. The second lens group includes a fourth lens element having power and a fifth lens element having positive power. When fG1 is a focal length of the first lens group at a d-line, fG2 is a focal length of the second lens group at the d-line, f4 is a focal length of the fourth lens element at the d-line, f is a focal length of an entire system at the d-line, and w is a half angle of view, a condition (1), a condition (3c) and a condition (6) shown below are satisfied.

$0.5 < fG1/fG2 < 3.0$    (1)

$11.5 < |f4/f|$    (3c)

$60 < w$    (6)

(Continued)

With this configuration, a single-focal lens system capable of favorably correcting various aberrations can be provided.

7 Claims, 9 Drawing Sheets

(56) References Cited

U.S. PATENT DOCUMENTS

| | | |
|---|---|---|
| 2012/0069140 A1 | 3/2012 | Tsai et al. |
| 2013/0128369 A1 | 5/2013 | Kim |
| 2016/0320688 A1 | 11/2016 | Sakagami |

FOREIGN PATENT DOCUMENTS

| | | |
|---|---|---|
| JP | 2005-227426 | 8/2005 |
| JP | 2009-063877 | 3/2009 |
| JP | 2010-8496 | 1/2010 |
| JP | 2010-243711 | 10/2010 |
| JP | 2016-38574 | 3/2016 |

SINGLE-FOCAL LENS SYSTEM, IMAGING DEVICE HAVING SINGLE-FOCAL LENS SYSTEM, AND MOVING BODY HAVING IMAGING DEVICE

This application is a U.S. National Phase application of PCT International Application PCT/JP2018/007353.

TECHNICAL FIELD

The present disclosure relates to a single-focal lens system, an imaging device having the single-focal lens system, and a moving body having the imaging device.

BACKGROUND ART

PTL 1 discloses a single-focal lens system including a first lens serving as a negative lens, a second lens serving as a meniscus lens whose convex surface is directed to an image, a diaphragm, a third lens serving as a positive lens, a fourth lens serving as a positive lens, and a fifth lens serving as a positive lens, which are disposed in this order from an object side to an image side.

Meanwhile, in recent years, as a lens system used in, for example, an on-vehicle camera or a surveillance camera, demand for a lens system with a wider angle has been growing rapidly.

CITATION LIST

Patent Literature

PTL 1: Unexamined Japanese Patent Publication No. 2016-38574

SUMMARY OF THE INVENTION

A single-focal lens system according to the present disclosure includes a first lens group having positive power, an aperture diaphragm, and a second lens group having positive power. The first lens group includes a first lens element having negative power, a second lens element having negative power, and a third lens element having positive power in this order from an object side to an image side. The second lens group includes a fourth lens element having power and a fifth lens element having positive power. When fG1 is a focal length of the first lens group at a d-line, fG2 is a focal length of the second lens group at the d-line, f4 is a focal length of the fourth lens element at the d-line, f is a focal length of an entire system at the d-line, and w is a half angle of view, a condition (1), a condition (3c) and a condition (6) shown below are satisfied.

$$0.5 < fG1/fG2 < 3.0 \quad (1)$$

$$11.5 < |f4/f| \quad (3c)$$

$$60 < w \quad (6)$$

The present disclosure provides a single-focal lens system that is excellent in various aberrations.

DESCRIPTION OF EMBODIMENTS

Hereinafter, exemplary embodiments will be described in detail with reference to the drawings. However, descriptions in more detail than necessary may be omitted. For example, a detailed description of a matter which is already well-known, or a repetitive description for a substantially identical configuration may be omitted. This is to avoid unnecessarily redundancy in the following description, and to facilitate understanding by those skilled in the art.

Note that the attached drawings and the following description are provided for those skilled in the art to fully understand the present disclosure, and are not intended to limit the subject matter as described in the appended claims.

In the present disclosure, a lens group means a group configured with one or more lens elements. Power, a composite focal length, and the like of each lens group are determined depending on kinds, a number, and an arrangement of the lens elements constituting each lens group.

Figure 1:
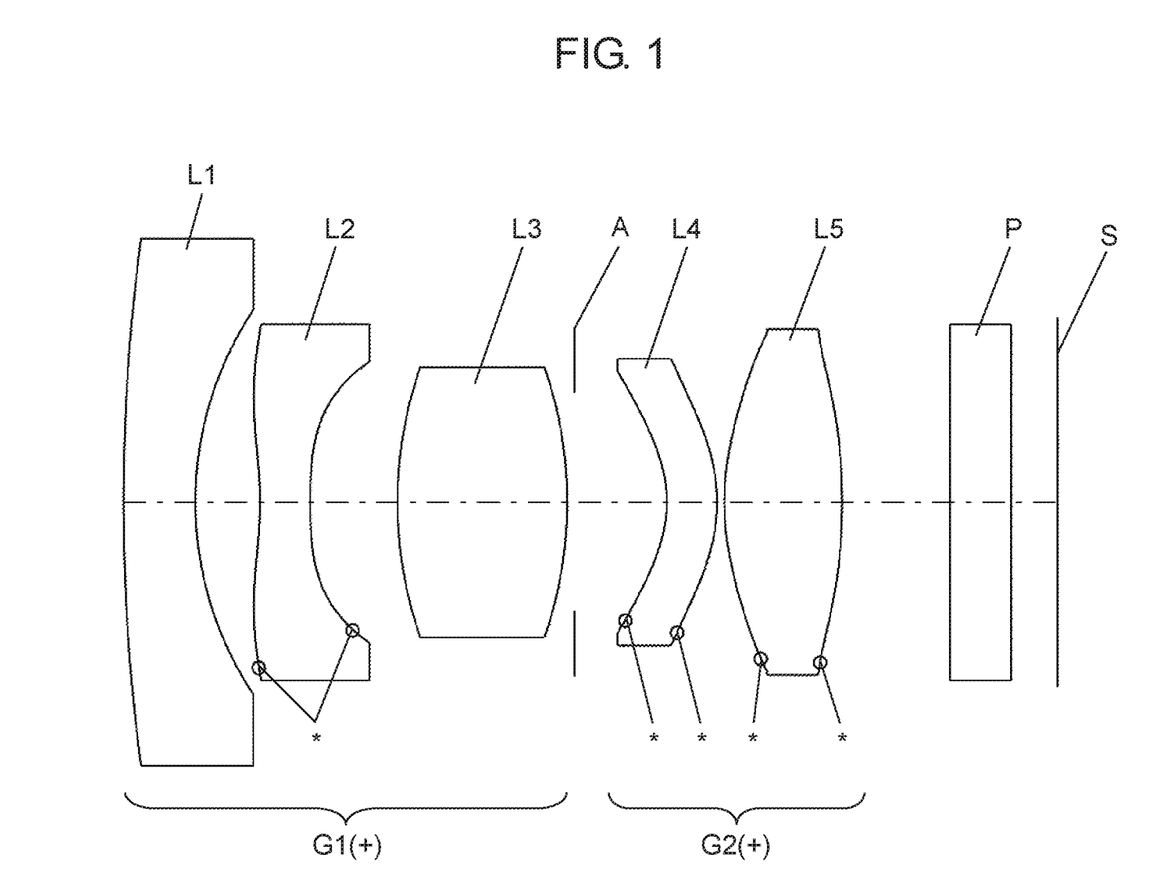
FIG. 1 is a lens arrangement diagram of a single-focal lens system according to a first exemplary embodiment.
Figure 3:
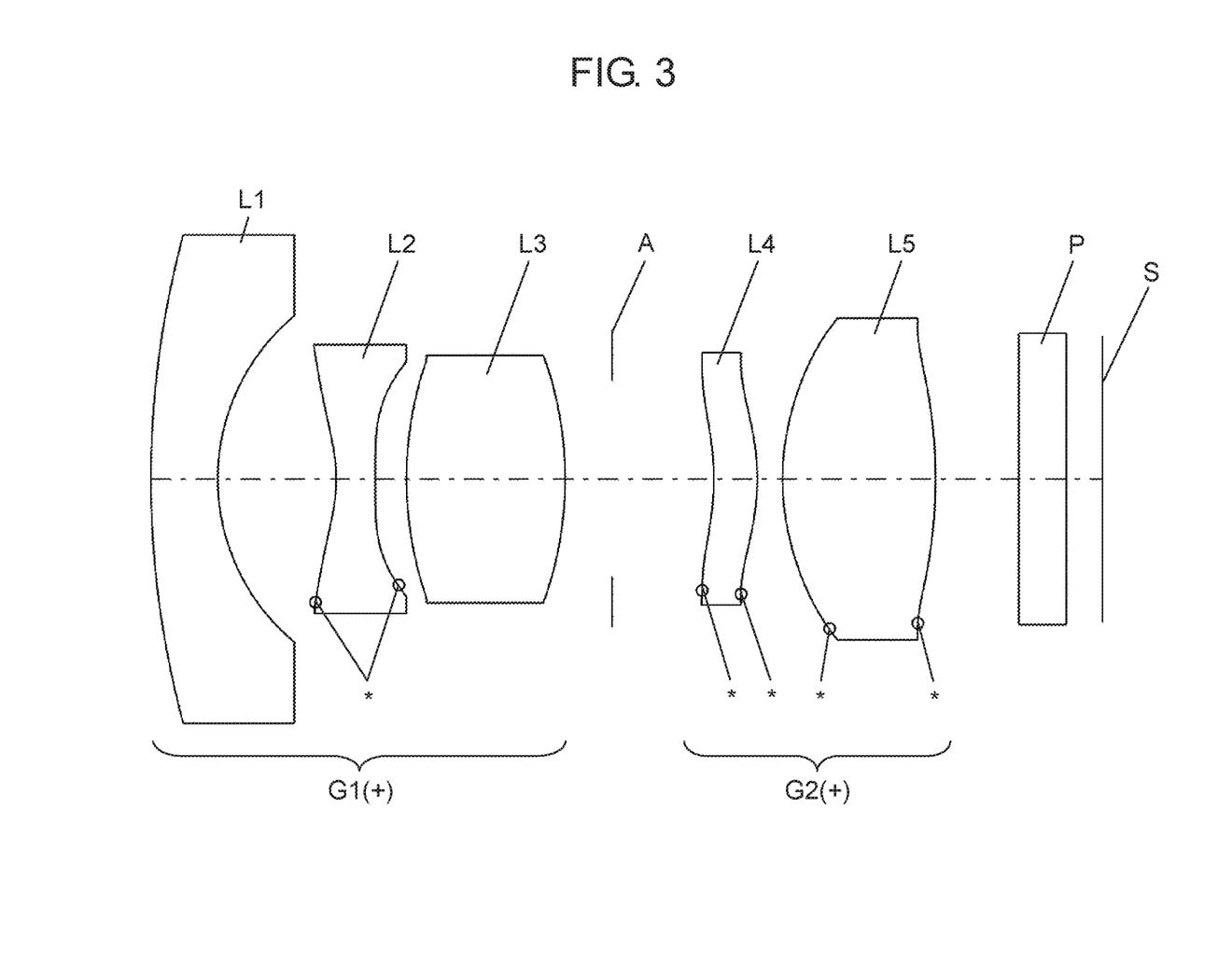
FIG. 3 is a lens arrangement diagram of a single-focal lens system according to a second exemplary embodiment.
Figure 5:
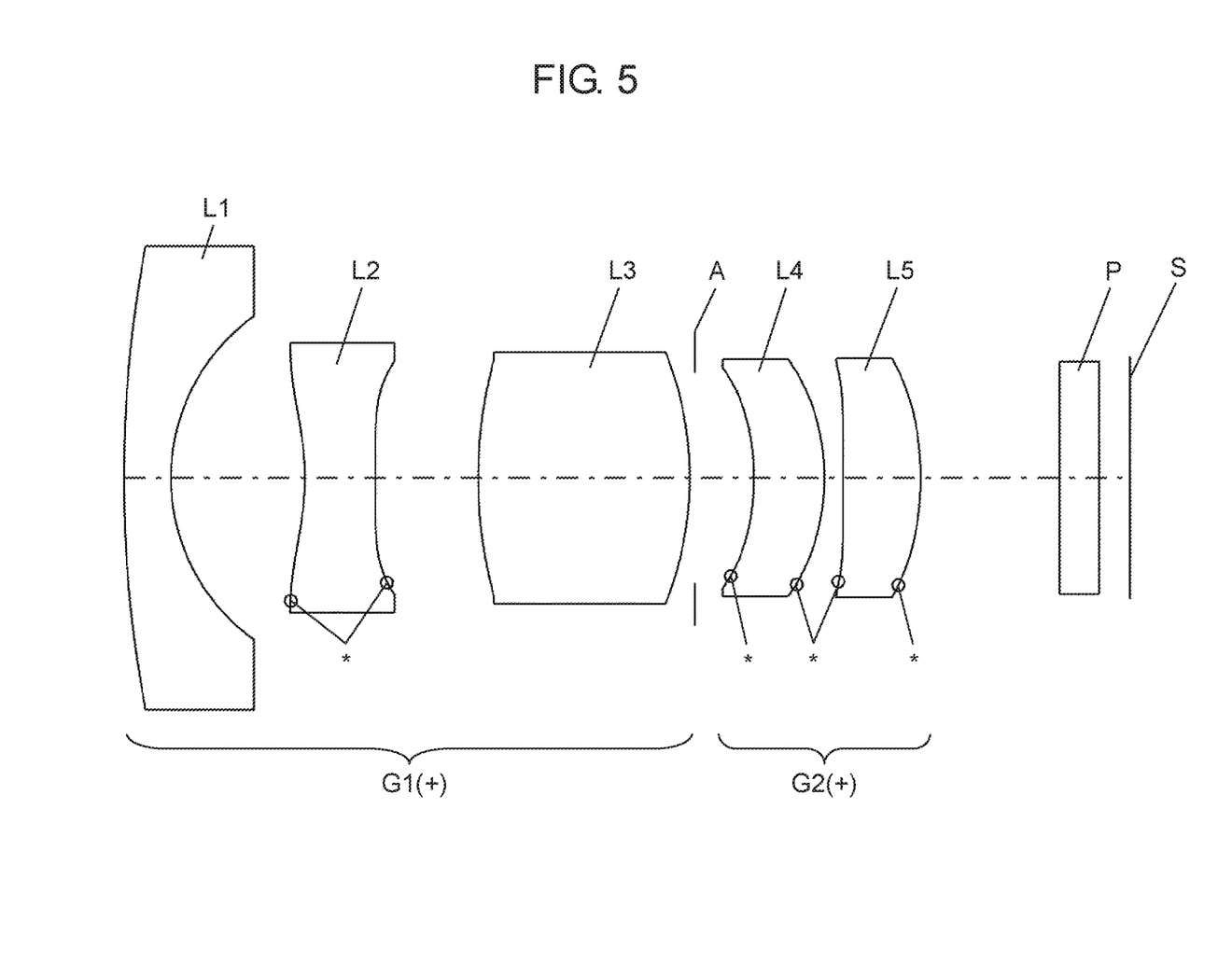
FIG. 5 is a lens arrangement diagram of a single-focal lens system according to a third exemplary embodiment.

FIG. 1, FIG. 3, and FIG. 5 are lens arrangement diagrams of single-focal lens systems according to the exemplary embodiments. Note that each of FIG. 1, FIG. 3, and FIG. 5 illustrates a lens arrangement of the single-focal lens system in an infinity focusing state.

In each diagram, an asterisk "f" attached to a certain surface shows that the surface is aspherical. Further, in each diagram, symbol (+) or symbol (−) attached to a sign of each lens group corresponds to a sign of power of each lens group. That is, symbol (+) indicates positive power, and symbol (−) indicates negative power. In each of the drawings, a straight line drawn at a rightmost side indicates a position of image surface S (corresponding to a position at which an imaging element to be described later is disposed). Note that aspect ratios of FIG. 1, FIG. 3, FIG. 5, and FIG. 7 are the same.

First Exemplary Embodiment

A single-focal lens system according to a first exemplary embodiment will be described below with reference to FIG. 1.

FIG. 1 is a lens arrangement diagram of the single-focal lens system according to the first exemplary embodiment.

The single-focal lens system according to the first exemplary embodiment includes, for example, first lens group G1 having positive power, aperture diaphragm A, second lens group G2 having positive power, and parallel plate P in this order from an object side to an image side. Note that the object side corresponds to a side of first lens group G1, and the image side corresponds to a side of image surface S.

First lens group G1 includes first lens element L1 having negative power, second lens element L2 having negative power, and third lens element L3 having positive power in this order from the object side to the image side.

Second lens group G2 includes fourth lens element L4 having negative power, and fifth lens element L5 having positive power in this order from the object side to the image side.

Each lens element will be described below.

First, the lens elements in first lens group G1 will be described. First lens element L1 is a grass lens having a meniscus shape whose convex surface is directed to an object. Second lens element L2 is a resin lens having a biconcave shape. In second lens element L2, concave surfaces on the object side and on the side of image surface S have aspherical shapes. Third lens element L3 is a grass lens having a biconvex shape.

Next, the lens elements in second lens group G2 will be described. Fourth lens element L4 is a resin lens having a meniscus shape whose convex surface is directed to image surface S. In fourth lens element L4, both surfaces on the object side and on the side of image surface S have aspherical shapes. Fifth lens element L5 is a resin lens having a biconvex lens shape. In fifth lens element L5, both surfaces on the object side and on the side of image surface S have aspherical shapes.

The single-focal lens system according to the first exemplary embodiment is thus configured.

Second Exemplary Embodiment

A single-focal lens system according to a second exemplary embodiment will be described below with reference to FIG. 3.

FIG. 3 is a lens arrangement diagram of the single-focal lens system according to the second exemplary embodiment.

The single-focal lens system according to the second exemplary embodiment is configured with, for example, first lens group G1 having positive power, aperture diaphragm A, second lens group G2 having positive power, and parallel plate P in this order from an object side to an image side.

First lens group G1 includes first lens element L1 having negative power, second lens element L2 having negative power, and third lens element L3 having positive power in this order from the object side to the image side.

Second lens group G2 includes fourth lens element L4 having positive power and fifth lens element L5 having positive power in this order from the object side to the image side.

Each lens element will be described below.

First, the lens elements in first lens group G1 will be described. First lens element L1 is a grass lens having a meniscus shape whose convex surface is directed to an object. Second lens element L2 is a resin lens having a meniscus shape whose convex surface is directed to image surface S. In second lens element L2, both surfaces on the object side and on the side of image surface S have aspherical shapes. Third lens element L3 is a grass lens having a biconvex shape.

Next, the lens elements in second lens group G2 will be described below. Fourth lens element L4 is a resin lens having a meniscus shape whose convex surface is directed to image surface S. In fourth lens element L4, both surfaces on the object side and on the side of image surface S have aspherical shapes. Fifth lens element L5 is a resin lens having a biconvex shape. In fifth lens element L5, both surfaces on the object side and on the side of image surface S have aspherical shapes.

The single-focal lens system according to the second exemplary embodiment is thus configured.

Third Exemplary Embodiment

A single-focal lens system according to a third exemplary embodiment will be described below with reference to FIG. 5.

FIG. 5 is a lens arrangement diagram of the single-focal lens system according to the third exemplary embodiment.

The single-focal lens system according to the third exemplary embodiment is configured with, for example, first lens group G1 having positive power, aperture diaphragm A, second lens group G2 having positive power, and parallel plate P in this order from an object side to an image side.

First lens group G1 includes first lens element L1 having negative power, second lens element L2 having negative power, and third lens element L3 having positive power in this order from the object side to the image side.

Second lens group G2 includes fourth lens element L4 having positive power and fifth lens element L5 having positive power in this order from the object side to the image side.

Each lens element will be described below.

First, the lens elements in first lens group G1 will be described. First lens element L1 is a grass lens having a meniscus shape whose convex surface is directed to an object. Second lens element L2 is a resin lens having a meniscus shape whose convex surface is directed to image surface S. In second lens element L2, both surfaces on the object side and on the side of image surface S have aspherical shapes. Third lens element L3 is a grass lens having a biconvex shape.

Next, the lens elements in second lens group G2 will be described below. Fourth lens element L4 is a resin lens having a meniscus shape whose convex surface is directed to image surface S. In fourth lens element L4, both surfaces on the object side and on the side of image surface S have aspherical shapes. Fifth lens element L5 is a resin lens having a biconvex shape. In fifth lens element L5, both surfaces on the object side and on the side of image surface S have aspherical shapes.

The single-focal lens system according to the third exemplary embodiment is thus configured.

(Conditions and Effects)

Hereinafter, conditions required for satisfying the configuration of the single-focal lens system according to any one of the first to third exemplary embodiments will specifically be described.

In other words, a plurality of possible conditions are defined to the single-focal lens system according to any one of the first to third exemplary embodiments. In this case, a configuration of the single-focal lens system that satisfies all the conditions is most effective.

Alternatively, by satisfying an individual condition as follows, a single-focal lens system exhibiting an effect corresponding to this condition can be obtained.

The single-focal lens system according to any one of the first to third exemplary embodiments is configured with, for example, first lens group G1 having positive power, aperture diaphragm A, and second lens group G2 having positive power in this order from an object side to an image side. First lens group G1 includes first lens element L1 having negative power, second lens element L2 having negative power, and third lens element L3 having positive power in this order from the object side to the image side. Second lens group G2 includes fourth lens element L4 having power and fifth lens element L5 having positive power.

The above single-focal lens system desirably satisfies the following condition (1), for example.

$$0.5 < fG1/fG2 < 3.0 \quad (1)$$

Herein, fG1 is a focal length of first lens group G1 at a d-line and fG2 is a focal length of second lens group G2 at the d-line.

According to the above single-focal lens system, first lens group G1 includes two lens elements each having negative power. This configuration can achieve a single-focal lens system whose entire viewing angle is wider than 100 degrees, for example, while favorably correcting various aberrations.

In other words, the condition (1) defines a relationship between the focal length of first lens group G1 at the d-line and the focal length of second lens group G2 at the d-line.

When fG1/fG2 is less than or equal to a lower limit (0.5) of the condition (1), the positive power of first lens group G1 is excessively strong. Therefore, achieving such a wide angle while favorably correcting various aberrations is difficult in the single-focal lens system.

When fG1/fG2 is more than or equal to an upper limit (3.0) of the condition (1), the positive power of second lens group G2 is excessively strong. Therefore, achieving downsizing while favorably correcting various aberrations is difficult in the single-focal lens system.

At this time, within a range of the condition (1), it is more desirable to satisfy any one of the following conditions (1a) and (1b).

$$0.55 < fG1/fG2 \quad (1a)$$

$$fG1/fG2 < 2.5 \quad (1b)$$

These conditions allow the above effects to be further improved.

Further, within the range of the condition (1), it is more desirable to satisfy any one of the following conditions (1c) and (1d).

$$0.6 < fG1/fG2 \quad (1c)$$

$$fG1/fG2 < 2.0 \quad (1d)$$

Consequently, the above-described effects are further improved.

In addition, the single-focal lens system in the present disclosure desirably satisfies the following condition (2), for example.

$$5.5 < |(L4R1+L4R2)/(L4R1-L4R2)| < 20 \quad (2)$$

Herein, L4R1 is a radius of curvature on an object side in fourth lens element L4, and L4R2 is a radius of curvature on an image side in fourth lens element L4.

In other words, the condition (2) defines a ratio of a sum of the radius of curvature on the object side in fourth lens element L4 and the radius of curvature on the image side in fourth lens element L4 to a difference between the radius of curvature on the object side in fourth lens element L4 and the radius of curvature on the image side in fourth lens element L4.

When $|(L4R1+L4R2)/(L4R1-L4R2)|$ is less than or equal to a lower limit (5.5) or is more than or equal to an upper limit (20), various aberrations, particularly an astigmatism cannot sufficiently be corrected. Therefore, securing favorable optical performance is difficult in the single-focal lens system.

At this time, within a range of the condition (2), it is more preferable to satisfy any one of the following conditions (2a) and (2b), or both the following conditions (2a) and (2b).

$$6.0 < |(L4R1+L4R2)/(L4R1-L4R2)| \quad (2a)$$

$$|(L4R1+L4R2)/(L4R1-L4R2)| < 15 \quad (2b)$$

These conditions allow the above effects to be more improved.

Further, within the range of the condition (2), it is more preferable to satisfy any one of the following conditions (2c) and (2d), or both the following conditions (2c) and (2d).

$$7.0 < |(L4R1+L4R2)/(L4R1-L4R2)| \quad (2c)$$

$$|(L4R1+L4R2)/(L4R1-L4R2)| < 10 \quad (2d)$$

These conditions allow the above-mentioned effects to be more improved.

In addition, the single-focal lens system in the present disclosure desirably satisfies the following condition (3), for example.

$$10.5 < |f4/f| < 20 \quad (3)$$

Herein, f4 is a focal length of fourth lens element L4 at a d-line and f is a focal length of an entire system at the d-line.

In other words, the condition (3) defines a relationship between the focal length of fourth lens element L4 at the d-line and the focal length of the entire system configuring the single-focal lens system at the d-line.

When $|f4/f|$ is less than or equal to a lower limit (10.5) of the condition (3), the negative power of fourth lens element L4 is excessively strong. Therefore, various aberrations, particularly an image surface curvature increases, whereby securing favorable optical performance is difficult in the single-focal lens system. In contrast, when $|f4/f|$ is more than or equal to an upper limit (20) of the condition (3), the negative power of fourth lens element L4 is excessively weak. Therefore, downsizing of the single-focal lens system is difficult.

At this time, within a range of the condition (3), it is more preferable to satisfy any one of the following conditions (3a) and (3b), or both the following conditions (3a) and (3b).

$$11.0 < |f4/f| \quad (3a)$$

$$|f4/f| < 17.5 \quad (3b)$$

These conditions allow the above effects to be more improved.

Further, within the range of the condition (3), it is more preferable to satisfy any one of the following conditions (3c) and (3d), or both the following conditions (3c) and (3d).

$$11.5 < |f4/f| \quad (3c)$$

$$|f4/f| < 15 \quad (3d)$$

These conditions allow the above-mentioned effects to be more improved.

In addition, the single-focal lens system in the present disclosure desirably satisfies the following condition (4), for example.

$$1.7 < ndL3 \quad (4)$$

Herein, ndL3 is a refractive index of third lens element L3 at the d-line.

That is, the condition (4) defines the refractive index of third lens element L3 at the d-line.

When ndL3 is less than or equal to a lower limit (1.7) of the condition (4), the radius of curvature required for keeping power of third lens element L3 is excessively small. That is, various aberrations, particularly a spherical aberration cannot sufficiently be corrected. Therefore, securing favorable optical performance is difficult in the single-focal lens system.

In addition, the single-focal lens system in the present disclosure desirably satisfies the following condition (5) together with the above-described condition (4), for example.

$$20<vdL3 \qquad (5)$$

Herein, vdL3 is an Abbe number of third lens element L3 at the d-line.

That is, the condition (5) defines the Abbe number of third lens element L3 at the d-line.

When vdL3 is less than or equal to a lower limit (20) of the condition (5), various aberrations, particularly a chromatic aberration cannot sufficiently be corrected. Therefore, securing favorable optical performance is difficult in the single-focal lens system.

In addition, the single-focal lens system in the present disclosure desirably satisfies the following condition (6), for example.

$$60<w \qquad (6)$$

Herein, w is a half angle of view.

The condition (6) is a condition relating to a diagonal half angle of view of the single-focal lens system.

When the condition (6) together with the condition (1) are satisfied, the widen angle can be achieved while maintaining excellent optical performance in the single-focal lens system.

For example, in the single-focal lens system in the present disclosure, a surface on the object side of second lens element L2 desirably has a shape having an inflection point out of the optical axis. This configuration enables preferable aberration correction at both of a portion near the optical axis and a portion out of the optical axis, in second lens element L2. Therefore, various aberrations, particularly the image surface curvature is sufficiently corrected. As a result, favorable optical performance is secured in the single-focal lens system.

Fourth Exemplary Embodiment

An imaging device according to a fourth exemplary embodiment, which has the single-focal lens system according to the first exemplary embodiment, will be described below with reference to FIG. 7. The imaging device is exemplified by a camera to be mounted on a moving body that moves with, for example, a vehicle or a person.

Note that the imaging device may include any one of the single-focal lens systems according to the second and third exemplary embodiments instead of the single-focal lens system according to the first exemplary embodiment.

Figure 7:
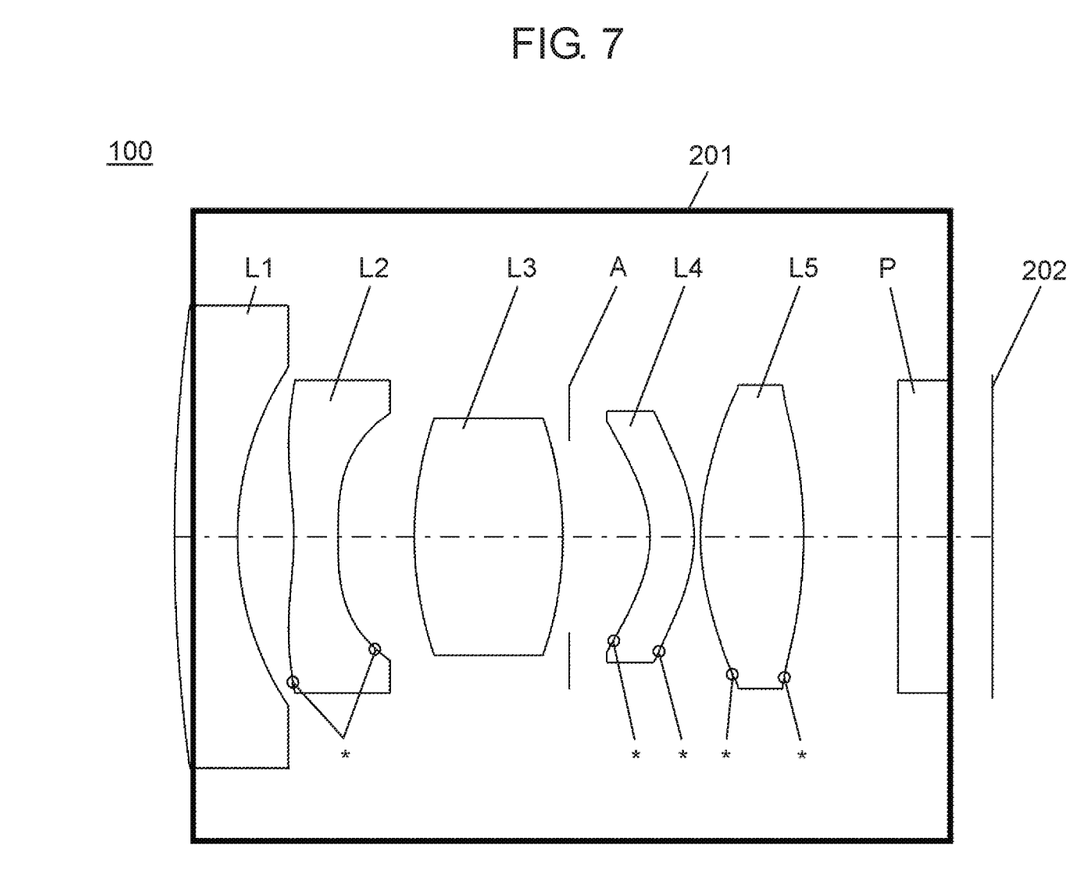
FIG. 7 is a schematic configuration diagram of an imaging device according to a fourth exemplary embodiment.

FIG. 7 is a schematic configuration diagram of a camera according to the fourth exemplary embodiment, which has the single-focal lens system according to the first exemplary embodiment.

Camera 100 as an example of the imaging device includes single-focal lens system 201, imaging element 202, and parallel plate P, for example. Single-focal lens system 201 forms an optical image of an object. Imaging element 202 converts the optical image formed by single-focal lens system 201 into an electrical image signal. Parallel plate P is configured with a bandpass filter that transmits, for example, only light having wavelengths of a near-infrared region (e.g., light having wavelengths from 800 nm to 1000 nm).

Imaging element 202 is disposed at a position of image surface S in the single-focal lens system according to the first exemplary embodiment as illustrated in FIG. 1. Color filters that receive light having the wavelengths of the near-infrared region are disposed in at least part or all of a plurality of pixels in imaging element 202, respectively.

Camera 100 having single-focal lens system 201 is thus configured.

Hereinafter, a configuration in which camera 100 described above is mounted on vehicle 500 such as an automobile serving as an example of the moving body with reference to FIG. 8.

Figure 8:
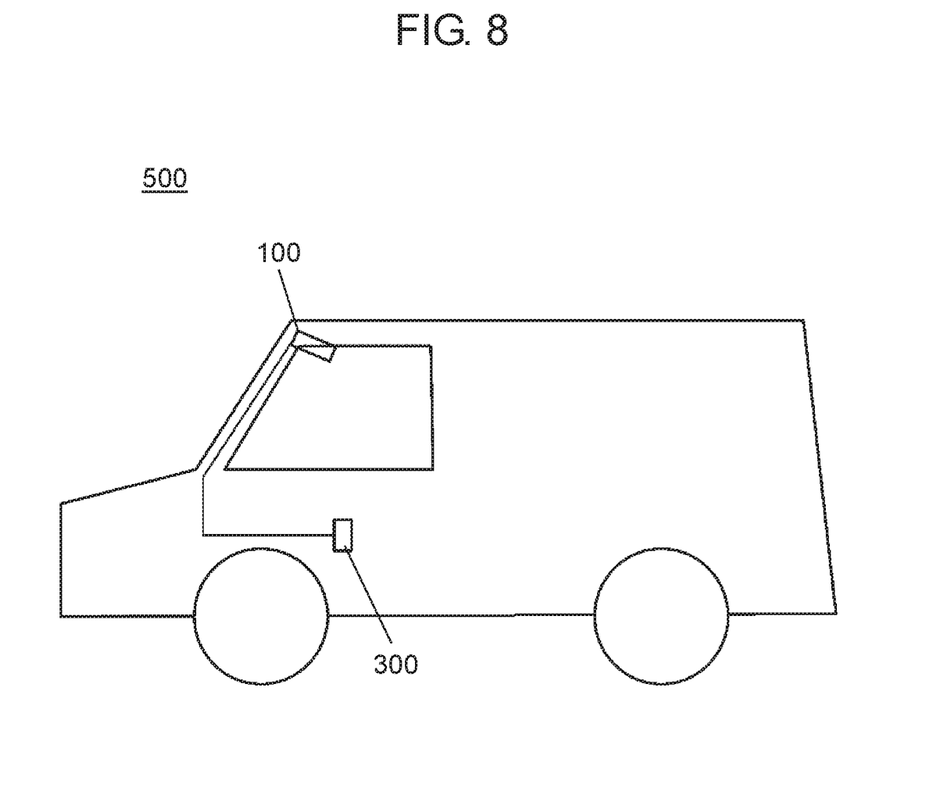
FIG. 8 is a schematic configuration diagram of a moving body on which the imaging device according to the fourth exemplary embodiment is mounted.

FIG. 8 is a schematic configuration view of the automobile equipped with camera 100 near a rearview mirror inside vehicle 500.

Camera 100 is disposed near the rear-view mirror (not illustrated) inside vehicle 500, while being directed to an interior. In other words, camera 100 is used as a sensing camera that images a driver and a passenger. A light-emitting diode (LED (not illustrated)) having wavelengths of the near infrared region (e.g., wavelengths from 800 nm to 1000 nm) is disposed near the rear-view mirror inside vehicle 500. The LED emits signal light whose light-emission intensity is modulated toward the interior of vehicle 500 (e.g., toward the driver and the passenger).

Camera 100 captures an image of the interior of vehicle 500 as a phase delay of reflection light of the LED. The captured image is used for sensing of postures or states of the driver and the passenger (particularly, the driver), for example.

Specifically, controller 300 first detects, based on the image captured by camera 100, distances to parts of the driver and the passenger that are the subjects with an area demodulation method, for example. Through this processing, distance image data including information on distances to the subjects can be obtained.

Next, controller 300 detects, for example, the state of the driver based on the distance image data thus obtained. Controller 300 determines whether the driver is in a state of possibly causing trouble to driving due to sleepiness or sudden illness, for example. When determining that the driver possibly causes trouble to driving, controller 300 gives the driver a warning. When the trouble to driving is not eliminated, controller 300 automatically stops vehicle 500. This operation secures safety of the driver and the passenger.

In other words, single-focal lens system 201 according to the present disclosure is effective as a lens system of the imaging device such as the sensing camera.

Other Exemplary Embodiments

The technique disclosed in the present disclosure has been described above with the first to fourth exemplary embodiments as examples.

However, the technique in the present disclosure is not limited to these exemplary embodiments, and is also applicable to exemplary embodiments subjected to changes, replacements, additions, omissions, or the like. In addition, new exemplary embodiments can be made by combining the constituent elements described in the first to fourth exemplary embodiments.

Accordingly, other exemplary embodiments will be described below.

A lens element having substantially no power may be added as appropriate to any of the single-focal lens systems according to the first to third exemplary embodiments.

The lens elements having aspherical shapes in the single-focal lens systems according to the first to third exemplary embodiments may be formed by polishing or molding, for example. Further, each of the lens elements may be formed by a so-called replicated lens (a hybrid lens) in which an aspherical coating is formed on a surface of a spherical lens.

Note that, in the fourth exemplary embodiment, an example in which any one of the single-focal lens systems according to the first to third exemplary embodiments is applied to camera 100 configuring the imaging device serving as the sensing camera that is disposed inside vehicle 500 and detects distances to parts of the driver and the passenger has been described, but the present disclosure is not limited to this example. Camera 100 having the single-focal lens system according to the present disclosure may be applied to a sensing camera that is attached to, for example, a lower part of a side mirror (particularly, on a side opposite to the driver) of vehicle 500 and senses an object present below. With this configuration, the driver can securely recognize a person or an object present in a blind area, and can perform an avoiding operation, for example. As a result, safety when operating, for example, an automobile can further be improved.

Figure 9:
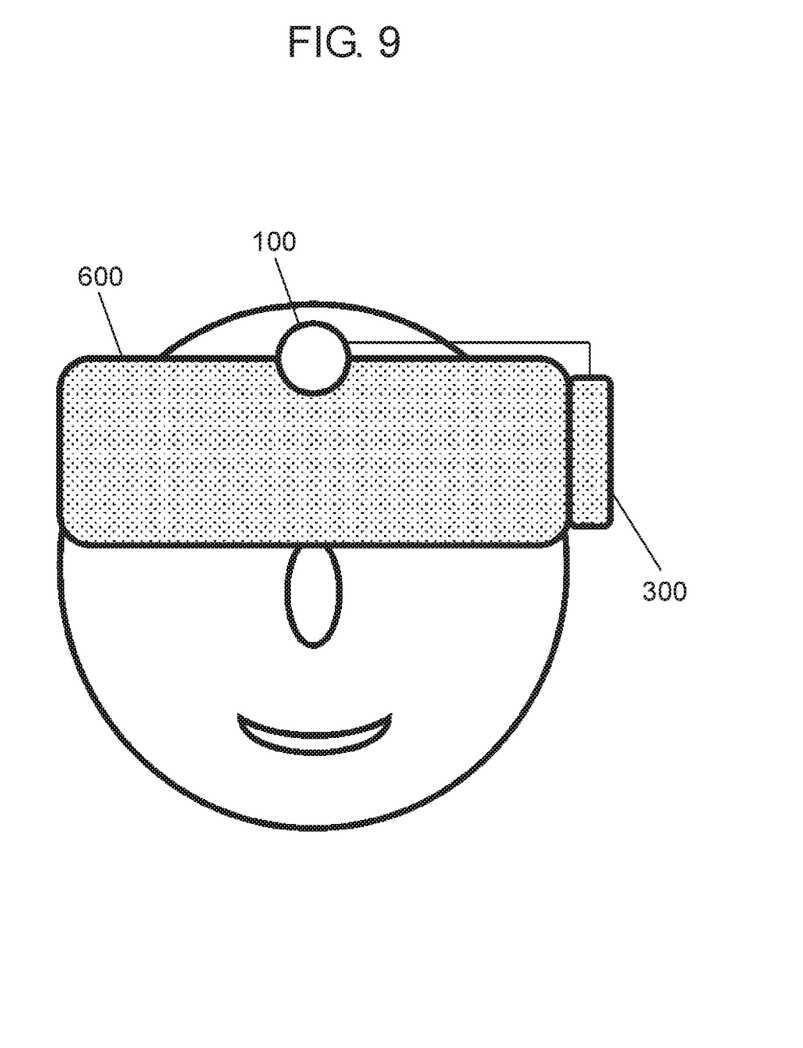
FIG. 9 is a schematic configuration diagram of a moving body on which an imaging device according to another exemplary embodiment is mounted.

Further, in the fourth exemplary embodiment, camera 100 mounted on the vehicle has been described as an example of the imaging device on which single-focal lens system 201 according to any one of the first to third exemplary embodiments is mounted, but the present disclosure is not limited to this example. For example, as illustrated in FIG. 9, camera 100 may be embedded into image display apparatus 600 serving as an example of a moving body that moves together with an operation of a person. In other words, image display apparatus 600 detects distances to parts such as an arm of a person wearing image display apparatus 600 through camera 100 with a wide angle of view (e.g., 100 degrees). Controller 300 then processes information including the detected distances. With this configuration, in a virtual reality space, the person wearing image display apparatus 600 can acquire experience with more reality, such as grasping something.

NUMERICAL EXAMPLES

First to third numerical examples specifically performed in the configuration of the single-focal lens system of any one of the first to third exemplary embodiments will be described below with reference to FIGS. 2, 4, and 6.

Note that in the numerical examples, the lengths in the tables are all in the unit of "mm", and the angles of view are all in the unit of "°". Note that the expression "angle of view" in the tables represents a diagonal half angle of view. In each numerical example, r is a radius of curvature, d is a distance between surfaces, nd is a refractive index at the d-line, vd is the Abbe number at the d-line, and n940 nm is a refractive index at a wavelength of 940 nm. Further, in the numerical examples, the surfaces marked with * are aspherical. The aspherical shape is defined by the following equation.

[Mathematical Formula 1]

$$Z = \frac{h^2/r}{1 + \sqrt{1 - (1+\kappa)(h/r)^2}} + \sum A_n h^n$$

Herein, Z is a distance from a point on the aspherical surface having height h from the optical axis to a tangential plane at a peak of the aspherical surface, h is a height from the optical axis, r is a radius of curvature at the peak, κ is a conic constant, and An is an aspherical coefficient of n-th order.

Figure 2:
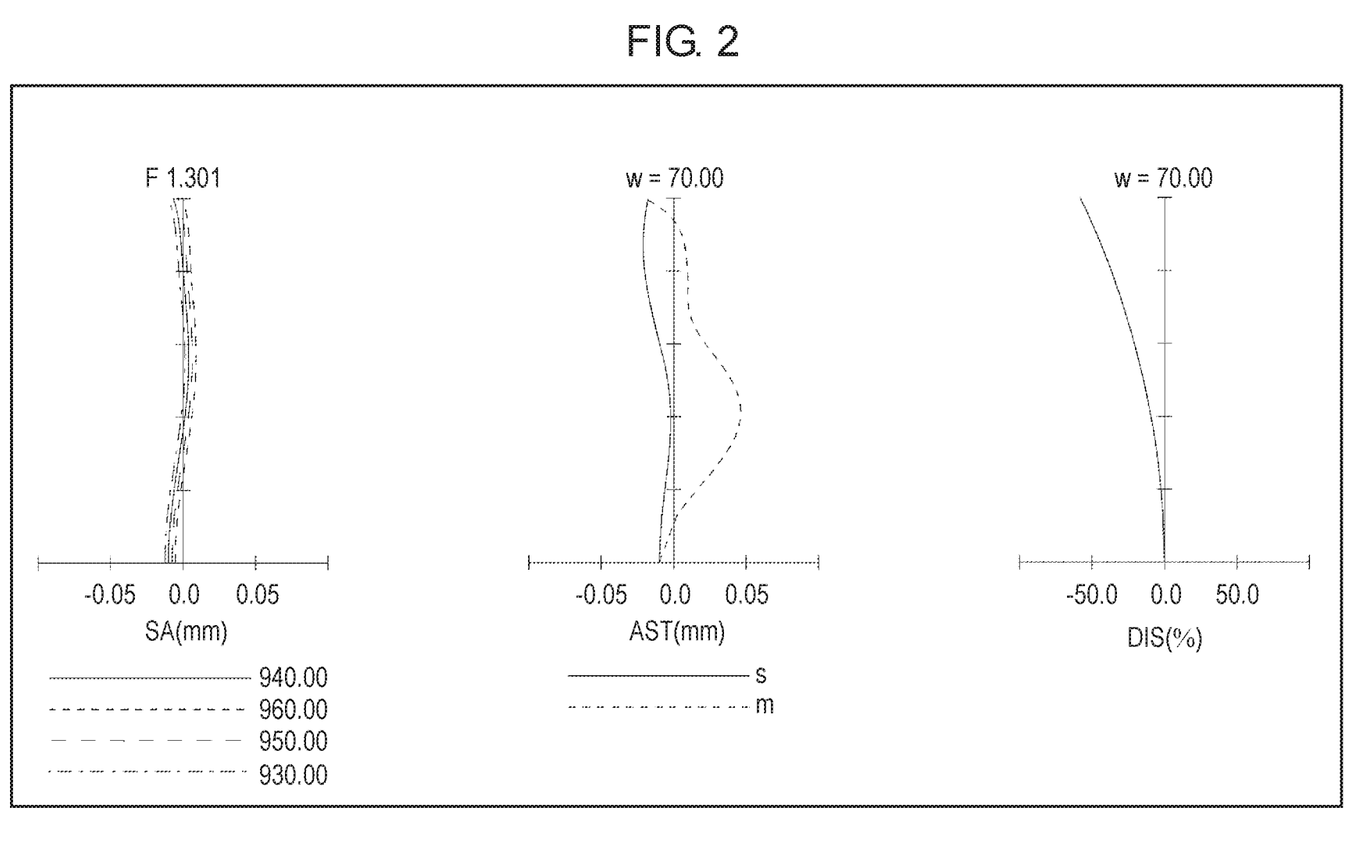
FIG. 2 is a longitudinal aberration diagram in an infinity focusing state according to a first numerical example of the first exemplary embodiment.
Figure 4:
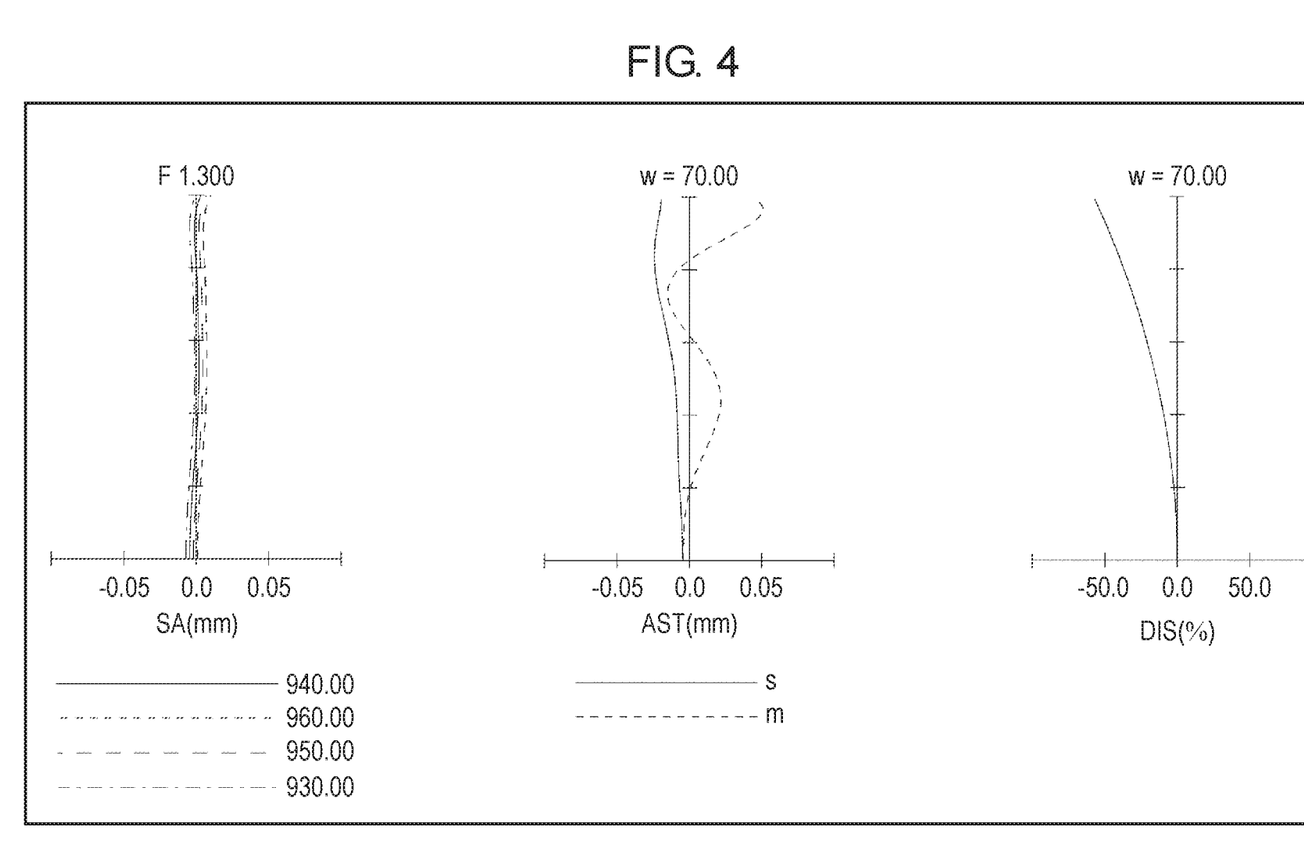
FIG. 4 is a longitudinal aberration diagram in an infinity focusing state according to a second numerical example of the second exemplary embodiment.
Figure 6:
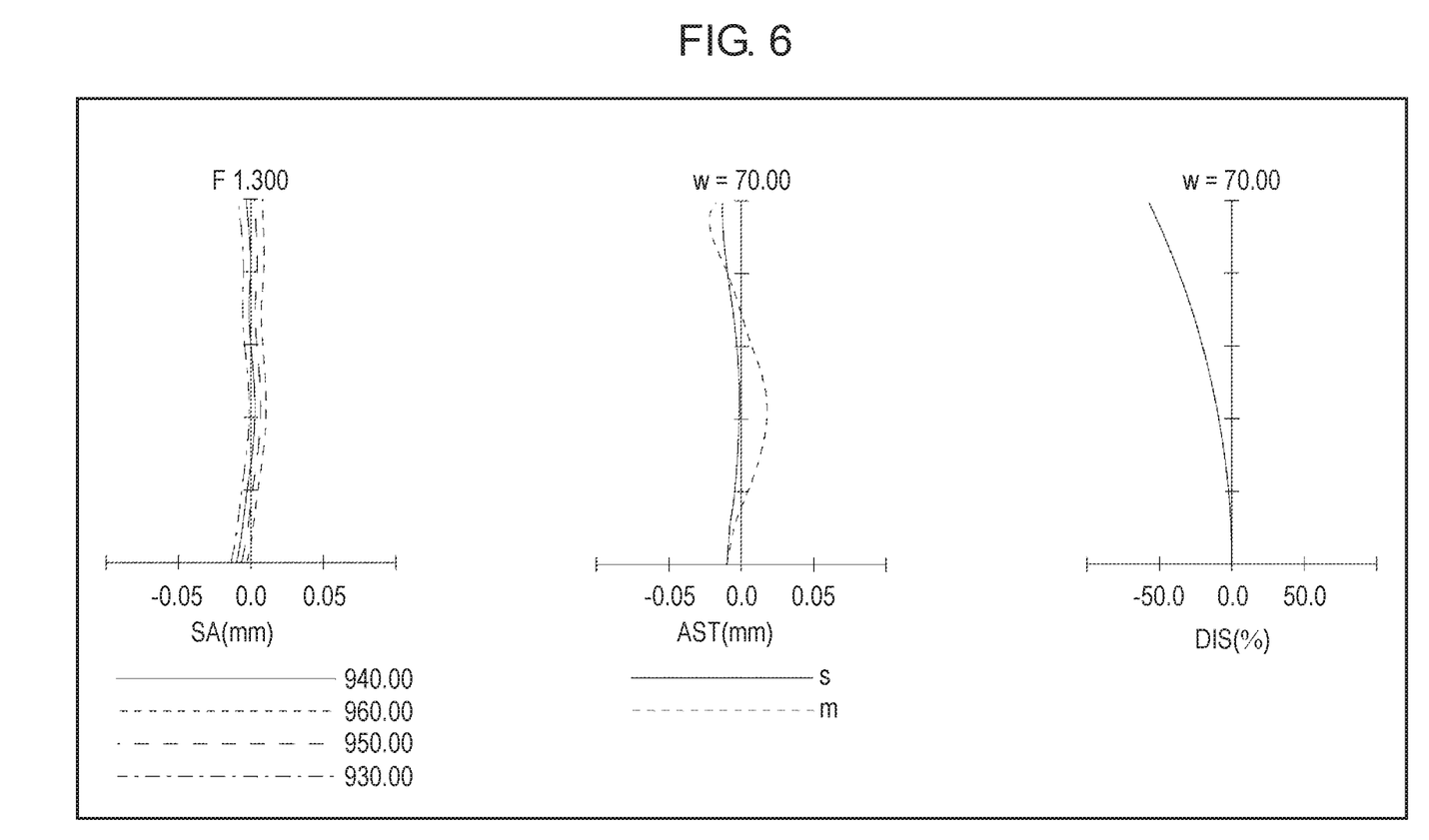
FIG. 6 is a longitudinal aberration diagram in an infinity focusing state according to a third numerical example of the third exemplary embodiment.

FIGS. 2, 4, and 6 are longitudinal aberration diagrams of single-focal lens systems in the infinity focusing state according to the first to third numerical examples corresponding to the first to third exemplary embodiments, respectively.

In each longitudinal aberration diagram, spherical aberration (SA) (mm), astigmatism (AST) (mm), and distortion (DIS) (%) are illustrated in order from the left.

In the view of the SA, a vertical axis indicates an F number (denoted by "F"), a solid line indicates a characteristic with respect to a wavelength of 940 nm, a short broken line indicates a characteristic with respect to a wavelength of 960 nm, a long broken line indicates a characteristic with respect to a wavelength of 950 nm, and an alternate long and short dash line indicates a characteristic with respect to a wavelength of 930 nm.

In the view of the AST, the vertical axis indicates an imaged height, the solid line indicates a characteristic with respect to a sagittal plane (denoted by "s"), and the broken line indicates a characteristic with respect to a meridional plane (denoted by "m"). Note that, w represents a half angle of view.

In the view of the DIS, the vertical axis indicates an imaged height, and w represents a half angle of view. Here, the solid line of distortion shows an aberration, assuming Y=f·tan(w) as the ideal imaged height (Y is an imaged height, and f is a focal length of the entire system).

First Numerical Example

The first numerical example of the single-focal lens system corresponding to the first exemplary embodiment in FIG. 1 will be described below. Specifically, as the first numerical example of the single-focal lens system, surface data is indicated in (Table 1), aspherical data is indicated in (Table 2), various pieces of data are indicated in (Table 3), and single lens data is indicated in (Table 4).

TABLE 1

(Surface data)

| Surface number | r | d | nd | vd | n940 nm |
|---|---|---|---|---|---|
| Object surface | ∞ | | | | |
| 1 | 27.29670 | 1.00000 | 1.92286 | 20.9 | 1.88540 |
| 2 | 4.77970 | 0.89770 | | | |
| 3* | −4.90230 | 0.70000 | 1.63970 | 23.5 | 1.61722 |
| 4* | 9.39690 | 1.21540 | | | |
| 5 | 5.66680 | 2.36000 | 1.92286 | 20.9 | 1.88540 |
| 6 | −5.66680 | 0.10000 | | | |
| 7 (Aperture diaphragm) | ∞ | 1.28680 | | | |
| 8* | −1.76330 | 0.70000 | 1.63970 | 23.5 | 1.61722 |
| 9* | −2.32560 | 0.10000 | | | |
| 10* | 3.51690 | 1.64000 | 1.63970 | 23.5 | 1.61722 |
| 11* | −8.07760 | 1.50000 | | | |

TABLE 1-continued (Surface data)

| Surface number | r | d | nd | vd | n940 nm |
|---|---|---|---|---|---|
| 12 | ∞ | 0.85000 | 1.51680 | 64.2 | 1.50838 |
| 13 | ∞ | 0.65000 | | | |
| 14 | ∞ | BF | | | |
| Image surface | ∞ | | | | |

TABLE 2

(Aspherical data)

Third surface

K = −2.29866E+01, A4 = 2.42071E−02, A6 = −4.35918E−03,
A8 = 4.82298E−04 A10 = −2.54206E−05
Fourth surface K = 0.00000E+00, A4 = 5.85806E−02, A6 = −8.88429E−03,
A8 = 1.88561E−03 A10 = −1.58654E−04
Eighth surface K = −3.05126E+00, A4 = −2.85608E−03, A6 = −3.05224E−03,
A8 = 2.20866E−03 A10 = −3.58299E−04
Ninth surface K = −1.89596E+00, A4 = 6.26342E−03, A6 = −3.79036E−03,
A8 = 2.07699E−03 A10 = −2.85058E−04
Tenth surface K = −4.16336E+00, A4 = −7.94771E−03, A6 = 2.28952E−03,
A8 = −2.29044E−04 A10 = 1.11058E−05
Eleventh surface K = −2.52333E+00, A4 = −4.24414E−03, A6 = 1.56743E−04,
A8 = 1.78414E−04 A10 = −1.20409E−05

TABLE 3

(Various pieces of data)

| Focal length | 1.9205 |
|---|---|
| F number | 1.25207 |
| Angle of view | 70.0000 |
| Imaged height | 2.2228 |
| Lens total length | 12.9999 |
| BF | 0.00000 |
| Entrance pupil position | 2.6251 |
| Exit pupil position | −9.6717 |
| Front-side principal point position | 4.1572 |
| Rear-side principal point position | 10.9026 |

TABLE 4

(Single lens data)

| Lens | Start surface | Focal length |
|---|---|---|
| 1 | 1 | −6.4154 |
| 2 | 3 | −4.9417 |
| 3 | 5 | 3.4111 |
| 4 | 8 | −22.1653 |
| 5 | 10 | 4.0538 |

Second Numerical Example

The second numerical example of the single-focal lens system corresponding to the second exemplary embodiment in FIG. 3 will be described below. Specifically, as the second numerical example of the single-focal lens system, surface data is indicated in (Table 5), aspherical data is indicated in (Table 6), various pieces of data are indicated in (Table 7), and single lens data is indicated in (Table 8).

TABLE 5

(Surface data)

| Surface number | r | d | nd | vd | n940 nm |
|---|---|---|---|---|---|
| Object surface | ∞ | | | | |
| 1 | 16.71060 | 1.20000 | 1.92286 | 20.9 | 1.88540 |
| 2 | 3.77200 | 2.13110 | | | |
| 3* | −2.58980 | 0.70000 | 1.63970 | 23.5 | 1.61722 |
| 4* | −68.71550 | 0.56140 | | | |
| 5 | 6.44390 | 2.85000 | 1.92286 | 20.9 | 1.88540 |
| 6 | −6.44390 | 0.84340 | | | |
| 7 (Aperture diaphragm) | ∞ | 1.83040 | | | |
| 8* | −4.40260 | 0.78000 | 1.63970 | 23.5 | 1.61722 |
| 9* | −3.98130 | 0.45240 | | | |
| 10* | 4.27100 | 2.75000 | 1.63970 | 23.5 | 1.61722 |
| 11* | −9.52520 | 1.50000 | | | |
| 12 | ∞ | 0.85000 | 1.51680 | 64.2 | 1.50838 |
| 13 | ∞ | 0.65000 | | | |
| 14 | ∞ | BF | | | |
| Image surface | ∞ | | | | |

TABLE 6

(Aspherical data)

Third surface

K = −2.29890E−01, A4 = 1.47350E−02, A6 = −1.18143E−03,
A8 = 9.16650E−05 A10 = −3.51484E−06
Fourth surface K = 0.00000E+00, A4 = 1.48450E−02, A6 = −8.93228E−04,
A8 = 1.52215E−04 A10 = −8.70433E−06
Eighth surface K = 5.27873E−01, A4 = −3.48421E−03, A6 = 5.11633E−04,
A8 = −2.06681E−04 A10 = 1.79126E−05
Ninth surface K = 1.17790E+00, A4 = 1.02204E−03, A6 = 4.33910E−04,
A8 = −1.51959E−04 A10 = 1.59347E−05
Tenth surface K = −6.57578E+15, A4 = −2.57642E−03, A6 = 7.98163E−05,
A8 = −1.68166E−04 A10 = 1.88599E−05
Eleventh surface K = 1.28605E+00, A4 = −6.93404E−04, A6 = 2.23988E−05,
A8 = −4.06183E−05 A10 = 4.85239E−06

TABLE 7

(Various pieces of data)

| Focal length | 1.8971 |
|---|---|
| F number | 1.24954 |
| Angle of view | 70.0000 |
| Imaged height | 2.2017 |
| Lens total length | 21.4024 |
| BF | 0.00000 |
| Entrance pupil position | 3.5820 |
| Exit pupil position | −11.4955 |
| Front-side principal point position | 5.1586 |
| Rear-side principal point position | 19.2378 |

TABLE 8

(Single lens data)

| Lens | Start surface | Focal length |
|---|---|---|
| 1 | 1 | −5.5383 |
| 2 | 3 | −8.6422 |
| 3 | 5 | 5.0768 |
| 4 | 8 | 30.8691 |
| 5 | 10 | 9.7478 |

Third Numerical Example

The third numerical example of the single-focal lens system corresponding to the third exemplary embodiment in FIG. 5 will be described below. Specifically, as the third numerical example of the single-focal lens system, surface data is indicated in (Table 9), aspherical data is indicated in (Table 10), various pieces of data are indicated in (Table 11), and single lens data is indicated in (Table 12).

TABLE 9

(Surface data)

| Surface number | r | d | nd | vd | n940 nm |
|---|---|---|---|---|---|
| Object surface | ∞ | | | | |
| 1 | 26.37850 | 1.00000 | 1.92286 | 20.9 | 1.88540 |
| 2 | 4.20360 | 2.85350 | | | |
| 3* | −4.74760 | 1.50000 | 1.63970 | 23.5 | 1.61722 |
| 4* | −37.75610 | 2.18350 | | | |
| 5 | 9.54070 | 4.50000 | 1.92286 | 20.9 | 1.88540 |
| 6 | −7.12190 | 0.10000 | | | |
| 7 (Aperture diaphragm) | ∞ | 1.26440 | | | |
| 8* | −5.34770 | 1.50000 | 1.63970 | 23.5 | 1.61722 |
| 9* | −4.66860 | 0.39980 | | | |
| 10* | 4433.59410 | 1.65000 | 1.63970 | 23.5 | 1.61722 |
| 11* | −6.24360 | 2.95120 | | | |
| 12 | ∞ | 0.85000 | 1.51680 | 64.2 | 1.50838 |
| 13 | ∞ | 0.65000 | | | |
| 14 | ∞ | BF | | | |
| Image surface | ∞ | | | | |

TABLE 10

(Aspherical data)

Third surface

K = −2.29890E−01, A4 = 1.47350E−02, A6 = −1.18143E−03,
A8 = 9.16650E−05 A10 = −3.51484E−06

Fourth surface

K = 0.00000E+00, A4 = 1.48450E−02, A6 = −8.93228E−04,
A8 = 1.52215E−04 A10 = −8.70433E−06

Eighth surface

K = 5.27873E−01, A4 = −3.48421E−03, A6 = 5.11633E−04,
A8 = −2.06681E−04 A10 = 1.79126E−05

Ninth surface

K = 1.17790E+00, A4 = 1.02204E−03, A6 = 4.33910E−04,
A8 = −1.51959E−04 A10 = 1.59347E−05

Tenth surface

K = −6.57578E+15, A4 = −2.57642E−03, A6 = 7.98163E−05,
A8 = −1.68166E−04 A10 = 1.88599E−05

Eleventh surface

K = 1.28605E+00, A4 = −6.93404E−04, A6 = 2.23988E−05,
A8 = −4.06183E−05 A10 = 4.85239E−06

TABLE 11

(Various pieces of data)

| Focal length | 1.8971 |
|---|---|
| F number | 1.24954 |
| Angle of view | 70.0000 |
| Imaged height | 2.2017 |
| Lens total length | 21.4024 |
| BF | 0.00000 |
| Entrance pupil position | 3.5820 |
| Exit pupil position | −11.4955 |
| Front-side principal point position | 5.1586 |
| Rear-side principal point position | 19.2378 |

TABLE 12

(Single lens data)

| Lens | Start surface | Focal length |
|---|---|---|
| 1 | 1 | −5.5383 |
| 2 | 3 | −8.6422 |
| 3 | 5 | 5.0768 |
| 4 | 8 | 30.8691 |
| 5 | 10 | 9.7478 |

(Values Corresponding to Conditions)

As described above, the single-focal lens system of any one of the first to third exemplary embodiments is specifically implemented in the first to third numerical examples, respectively.

(Table 13) below illustrates values corresponding to the above conditions (1) to (6) in each numerical example.

TABLE 13

| | | First numerical example | Second numerical example | Third numerical example |
|---|---|---|---|---|
| Condition (1) | fG1/fG2 | 1.254466 | 2.932652 | 0.523878 |
| Condition (2) | \|(L4R1 + L4R2)/(L4R1 − L4R2)\| | 7.27174 | 19.90000 | 14.74909 |
| Condition (3) | \|f4/f\| | 11.54142 | 19.56088 | 16.27185 |
| Condition (4) | ndL3 | 1.92286 | 1.92286 | 1.92286 |
| Condition (5) | vdL3 | 20.90 | 20.90 | 20.90 |
| Condition (6) | w | 70.0000 | 70.00000 | 70.00000 |

As illustrated in (Table 13), it is shown that the single-focal lens system implemented in each numerical example satisfies the conditions (1) to (6).

As described above, the single-focal lens system that is excellent in various aberrations, the imaging device having the single-focal lens system, and the moving body having the imaging device can be provided.

INDUSTRIAL APPLICABILITY

For example, the single-focal lens system of the present disclosure can be applied to a digital still camera, a digital video camera, a camera of a cellular phone, a camera of a personal digital assistance (PDA), an on-vehicle camera, a sensing camera for measuring a distance to a subject, a surveillance camera, and a Web camera. In particular, the present disclosure is suitable for a camera that requires a wide angle lens, such as the on-vehicle camera or the surveillance camera.

REFERENCE MARKS IN THE DRAWINGS

G1: first lens group
G2: second lens group

L1: first lens element
L2: second lens element
L3: third lens element
L4: fourth lens element
L5: fifth lens element
P: parallel plate
A: aperture diaphragm
S: image surface
100: camera (imaging device)
201: single-focal lens system
202: imaging element
300: controller
500: vehicle (moving body)
600: image display apparatus

The invention claimed is:

1. A single-focal lens system consisting of, in order from an object side to an image side:
a first lens group having positive power;
an aperture diaphragm; and
a second lens group having positive power,
wherein the first lens group consists of
a first lens element having negative power,
a second lens element having negative power, and
a third lens element having positive power,
the second lens group consists of
a fourth lens element having power, and
a fifth lens element having positive power, and
a condition (1), a condition (3c) and a condition (6) shown below are satisfied, $$0.5 < fG1/fG2 < 3.0 \tag{1}$$

$$11.5 < |f4/f| \tag{3c}$$

$$60 < w \tag{6}$$

when fG1 is a focal length of the first lens group at a d-line, fG2 is a focal length of the second lens group at the d-line, f4 is a focal length of the fourth lens element at the d-line, f is a focal length of an entire system at the d-line, and w is a half angle of view.

2. The single-focal lens system according to claim 1, wherein a condition (2) shown below is satisfied, $$5.5 < |(L4R1+L4R2)/(L4R1-L4R2)| < 20 \tag{2}$$

when L4R1 is a radius of curvature on the object side of the fourth lens element, and L4R2 is a radius of curvature on the image side of the fourth lens element.

3. The single-focal lens system according to claim 1, wherein a condition (4) shown below is satisfied, $$1.7 < ndL3 \tag{4}$$

when ndL3 is a refractive index of the third lens element at the d-line.

4. The single-focal lens system according to claim 3, wherein a condition (5) shown below is satisfied, $$20 < vdL3 \tag{5}$$

when vdL3 is an Abbe number of the third lens element at the d-line.

5. The single-focal lens system according to claim 1, wherein a shape of a surface on the object side of the second lens element has an inflection point out of an optical axis.

6. An imaging device capable of outputting an optical image of an object as an electrical image signal, the imaging device consisting of:
a single-focal lens system that forms the optical image of the object; and
an imaging element that converts the optical image formed by the single-focal lens system into the electrical image signal,
wherein the single-focal lens system consists of, in order from an object side to an image side,
a first lens group having positive power,
an aperture diaphragm, and
a second lens group having positive power,
the first lens group consists of
a first lens element having negative power,
a second lens element having negative power, and
a third lens element having positive power,
the second lens group consists of
a fourth lens element having power, and
a fifth lens element having positive power, and
a condition (1), a condition (3c) and a condition (6) shown below are satisfied, $$0.5 < fG1/fG2 < 3.0 \tag{1}$$

$$11.5 < |f4/f| \tag{3c}$$

$$60 < w \tag{6}$$

when fG1 is a focal length of the first lens group at a d-line, fG2 is a focal length of the second lens group at the d-line, f4 is a focal length of the fourth lens element at the d-line, f is a focal length of an entire system at the d-line, and w is a half angle of view.

7. A moving body that converts an optical image of an object into an electrical image signal and performs at least one of display and record of the electrical image signal being converted, the moving body consisting of:
a single-focal lens system that forms the optical image of the object;
an imaging element that converts the optical image formed by the single-focal lens system into the electrical image signal; and
a controller that controls the imaging element,
wherein the single-focal lens system consists of, in order from an object side to an image side,
a first lens group having positive power,
an aperture diaphragm, and
a second lens group having positive power,
the first lens group consists of
a first lens element having negative power,
a second lens element having negative power, and
a third lens element having positive power,
the second lens group consists of
a fourth lens element having power, and
a fifth lens element having positive power, and
a condition (1), a condition (3c) and a condition (6) shown below are satisfied, $$0.5 < fG1/fG2 < 3.0 \tag{1}$$

$$11.5 < |f4/f| \tag{3c}$$

$$60 < w \tag{6}$$

when fG1 is a focal length of the first lens group at a d-line, fG2 is a focal length of the second lens group at the d-line, f4 is a focal length of the fourth lens element at the d-line, f is a focal length of an entire system at the d-line, and w is a half angle of view.

* * * * *